May 12, 1942.  L. F. MUNSON  2,283,149
LOCATING DEVICE FOR USE WITH RECORDING SCALES

Filed Aug. 1, 1940

INVENTOR.
LOWELL F. MUNSON
BY
ATTORNEY.

Patented May 12, 1942

2,283,149

UNITED STATES PATENT OFFICE 2,283,149

LOCATING DEVICE FOR USE WITH RECORDING SCALES

Lowell F. Munson, St. Paul, Minn., assignor to Fairbanks, Morse & Co., Chicago, Ill., a corporation of Illinois Application August 1, 1940, Serial No. 349,121

5 Claims. (Cl. 265—5)

This invention relates to locating devices for use with recording scales, and more particularly to an improved alignment finger assembly of a type to be utilized in connection with a locating disc or star wheel, of recording dial scales.

Considerable difficulty has been heretofore experienced in mechanism of this class, due to the fact that an alignment finger of any of the types known to have been formerly employed, occasionally comes to rest and hangs on a tooth rather than in one of the notches or recesses between the teeth, of a star wheel or locating disc. It may be noted that such disc is usually one of an assembly of discs, fixedly angularly related to each other and which assembly rotates with or in response to, say, the pointer shaft of a dial scale. When the noted condition obtains, and the locating disc or wheel is wrongly engaged, the locating finger thus prevents the various weight-sensing fingers from accurately reflecting, each from its respective disc, the accurate weight indicated by the pointer or dial of the scale. This condition thus results, in a recording and printing scale, in the registration of a false or inaccurate weight value. It is accordingly a general object of the invention positively to overcome errors of the kind and arising out of the cause above noted.

Yet another object of the invention is attained in a novel arrangement of multiple locating or alignment fingers such that the finger assembly is capable of effecting a slight angular displacement of the locating disc or star wheel prior to effective operative engagement of the weight value discs by their respective locating or sensing fingers, in such manner as to assure recording of correct weight values.

Yet another object is attained in the provision of both a main and an auxiliary alignment finger, the auxiliary finger serving to direct the cooperating main locating finger, into exactly the proper recesses or notch on the locating disc or star wheel, whereby to assure accuracy of function in the remaining discs and fingers of the sensing mechanism.

Figure 1:
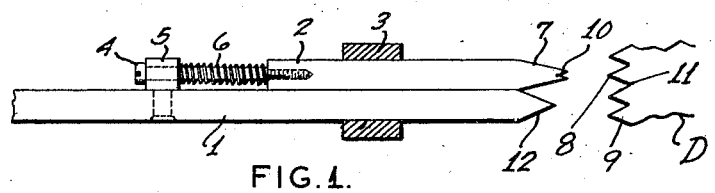
Figure 2:
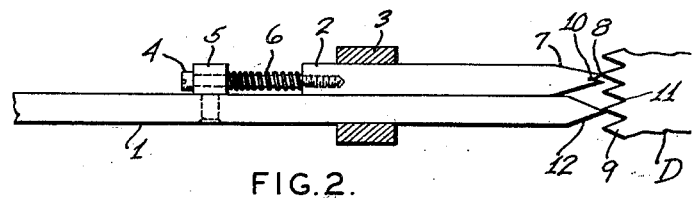
Figure 3:
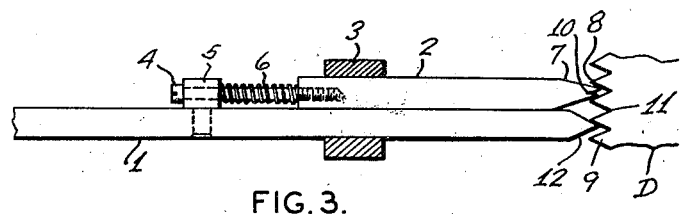
Figure 4:
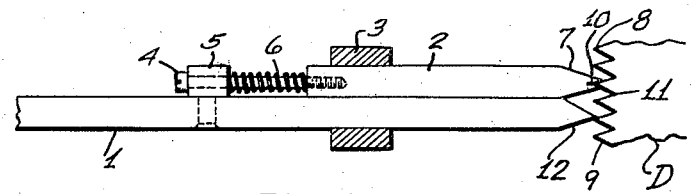

The foregoing and numerous other objects will more clearly appear from the following detailed description of a preferred embodiment of the invention, considered in connection with the accompanying drawing, in which:

Fig. 1 is an enlarged view showing the alignment finger and the weight locating finger associated therewith in their pre-operative positions in relation to the weight locating disc, a part only of which is shown; Fig. 2 is a view showing the operative position of the alignment and locating fingers, when the notched alignment finger either engages or comes to rest on the tip of one of the teeth of the locating disc, with the locating finger engaging the side of an adjacent disc notch; Fig. 3 is a view showing the operative position of the alignment and locating fingers, when the alignment finger enters a notch in the weight locating disc, and Fig. 4 is a view showing the operative position of the alignment and locating fingers, when the notched alignment finger engages a tip of one of the teeth of the locating disc.

In the drawing I indicates a weight locating finger which is slidably mounted and under operative control of a recorder, and is adapted in operation to be advanced to engage the locating disc D at the selected weight designation. Such a recorder and co-operating dial scale, with which the present invention is especially adapted for use, is described in Patent No. 2,070,011, Recording scale, Harlan A. Hadley and Guldbrand Guldbrandsen, February 9, 1937. The disclosure of cooperating mechanism shown by said patent may be considered as incorporated herein by this reference, for completeness of description.

In the apparatus described in the patent there is provided an integral weight value selector unit mounted on the scale indicator shaft, and having a locating disc angularly fixed with respect to a series of weight value selector discs, which are set up thereby at the nearest point where the scale indicator comes to rest, and are adapted to transmit the weight value of the load to the cooperating recording mechanism.

Located in closely cooperative, parallel relation to the locating finger I and slidable thereon is an alignment finger 2, both of which are slidably mounted in guideways 3. The alignment finger serves primarily in conjunction with the locating finger, as a means for locking the locating finger I in the proper one of the notches of the weight locating disc D, at the selected weight designation of the load as hereinafter described. As the alignment finger 2 is advanced it is guided in its movement by a headed guide rod in the form of a screw 4, which is attached to the lower or outer end of the alignment finger 2 and is slidably mounted in an apertured boss 5 secured, as by an integral rivet portion, to the locating finger I. In order to render the alignment finger 2 constantly resilient in its engagement with the locating disc D an expanded spiral spring 6 is mounted on the guide rod 4, and has its ends engaging the lower end of the finger 2 and the inner side of the boss 5. The outward movement of the alignment finger 2 is stopped or limited by the head of element 4, and is so adjusted and limited by the head of the guide rod 4 that the tip 7 of the finger may be readily positioned on the locating disc D and released therefrom without jamming of the cooperating parts. The adjustment provided by the threads on element 4, enables an accurate setting of finger 2, at a definite distance forwardly of finger 1, say $\frac{1}{16}$".

The locating disc D is provided with a series of teeth and a series of intervening notches, with one or the other of which the alignment finger is adapted to engage when in its operative position. Therefore, in order to permit the alignment finger 2 to be securely seated on the tip 8 of a disc tooth 9 when in engagement therewith, the tip 7 of the finger is provided with a transverse, elongate notch 10, adapted to engage and cooperate with the tip 8 of the disc tooth 9. At the same time the associated locating finger 1 is advanced to be partially inserted in a cooperating disc notch 11, thus locking the weight locating finger 1 and the disc D at that position in accordance with the weight indication of the load as shown in Fig. 4.

In its other operating position the tip 7 of the alignment finger 2 becomes seated in a cooperating notch 11 of the disc D with the tip 12 of the locating finger 1 also inserted in a disc notch 11 and locked therein, as shown in Fig. 3. Thus the alignment finger 2 cooperates with the disc D, as set up in its selected position, to engage either the tip 8 of a disc tooth 9 or a disc notch 11, in both of which cases the alignment finger 2 serves to engage the disc D so as to permit the locating finger 1 correctly to set up the weight indication of the load.

However, in case the alignment finger 2 for any reason, due to wear of the parts or otherwise, should stick or lodge on the tip 8 of a disc tooth 9, as shown in Fig. 2, the locating finger 1 advances its tip 12 into a disc notch 11 as shown in Fig. 2 so as to engage one side or other of a cooperating disc tooth 9. As the tip 12 slides along the lower side of the tooth in the example shown in Fig. 2, it turns the disc D in a clockwise direction, which causes the tip 7 of the alignment finger 2 to be freed from the tooth 9 and to enter a disc notch 11 while the locating finger 1 is likewise engaged in a disc notch 11, and the disc locked in its selected weight designating position, as shown in Fig. 3. However, when the tip 12 of the locating finger 1 engages the upper side of a disc tooth 9 the disc D will be turned in a counterclockwise direction and the disc locked in position as described above.

It is evident, therefore, that the alignment finger 2 presents effective means for positively locking the weight locating finger 1 and the locating disc D at the established weight designation of the load under varying operating conditions, whereby the accurate weight value of the load may be transmitted to the recorder.

It is preferred that the locating finger 1, be provided with an adjustment for closely and accurately varying the effective, or total operative length thereof, between its actuating member, and the locating disc or star wheel D. A suitable adjustment for this purpose, incorporated herein by this reference, is disclosed by Fig. 13 of the aforementioned patent to Hadley, et al No. 2,070,011; through manipulation of the screws 63 and 60 therein shown, a close and accurate adjustment may be readily effected. Any other suitable means for varying the effective length of the locating finger, may of course be employed.

The manner of assembly of parts, as well as the procedure in effecting their original adjustments and settings, and function in operation are thought to have been fully apparent from the foregoing description, but it may be further briefly pointed out that it is highly desirable so to determine the loading of spring 6, and so to adjust the screw 4 and the immediately appurtenant parts, that the finger 2 will normally be disposed, when in inoperative position, slightly ahead of the companion finger 1, say a distance of $\frac{1}{16}$". The manner of effecting initial setting of the device will be apparent from the disclosure of the patent to Hadley et al., hereinabove mentioned.

It will have appeared from the drawing and foregoing description that it is entirely possible and not unusual, because of the tendencies of both finger elements 1 and 2 to assume a position as close as possible in engagement with the disc D, that one or the other, perhaps both of the fingers may in engaging the sloping teeth of the disc, effect a slight angular shift in disc position. This facility is of importance, but the extent of angular displacement is so small as merely to serve in rounding off true weight values, and yet not so great as to create any undesirable inaccuracy in weight recording. It is, however, important to be noted in connection with this characteristic of the combination, that there be no substantial restraint or braking effect on the scale indicator shaft or its appurtenances, and hence no such restraint against the described slight angular displacement of disc D. This feature is mentioned because of certain prior attempts toward evolving a weight recording mechanism for use in connection with a locating disc or the like which is constrained to a fixed position prior to application of the locating elements to the disc. For convenience of reference and purposes of claim the freely angularly shiftable dial shaft, specifically the locating disc thereon, is herein referred to as a "floating" disc arrangement.

A reasonable period of commercial usage and success in the field has demonstrated that the paired, independently movable coacting fingers exemplified by those designated 1 and 2 of the present disclosure, serve fully to overcome the difficulties hereinabove noted, and assuming correct initial adjustments, will serve dependently to prevent inaccurate recording of weight values on the associated scale.

Since various changes and modifications in the construction and the operation of the embodiment illustrated may be made that would come within the scope of the invention, it is not intended to limit the invention to the exact details of construction shown.

I claim:

1. In a setting mechanism for recording scales, a floating locating disc having a notched periphery, a pair of adjacent parallel fingers reciprocally mounted and endwise presented toward the locating disc, the fingers having edge portions adapted to coact with the notches on the disc for purposes of disc alignment, a spring carried by an extension of one of said fingers, and a stop abutted by the spring and carried by the other finger, and coacting with the said extension to limit the movement of the first said finger relative to said other finger under the influence of the spring and in a direction toward the locating disc, the extension and stop being adapted to provide adjustably variable end points of relative finger movement when the fingers are free of the disc.

2. In a setting mechanism for recording scales, a floating locating disc having a notched periphery, a pair of adjacent parallel fingers endwise presented toward the locating disc, and having apex portions adapted to coact with the notches on the disc, for disc alignment, a guide element through which both of said fingers are adapted to slide, and in which they are reciprocally mounted, the guide element being formed to keep the fingers in substantially parallel adjacence and engaging the upper surface of one finger and the lower surface of the other finger, and means carried by the fingers, adapted to limit the movement of one thereof, relative to the other, in a direction toward the locating disc, said means including elements one of which is adjustably positioned on one of the fingers for varying the relative axial positions of the fingers when out of engagement with the locating disc.

3. In alignment mechanism for recording scales, a floating locating disc having a notched periphery, a pair of adjacent parallel fingers reciprocally mounted for movement to and from the locating disc, the fingers being provided with tooth portions coacting with the notched disc periphery, a headed screw element engaging one of the fingers, a guide for the screw element carried by the other finger, the head of the screw coacting with the guide to constitute a stop adapted to limit the forward movement of the first finger relative to the second said finger in a direction toward the disc, the screw and guide coacting to provide an adjustment of initial relative axial positions of the two fingers, and a spring carried by the screw and tending to bias one of the fingers axially with respect to the other finger.

4. In a device of the type and for the purpose described, and in combination with a floating locating disc, a pair of parallel, reciprocally operable fingers adapted to coact with the locating disc, a plurality of apex portions on one of said fingers, a single such apex portion on the companion finger, a headed screw element carried by one of said fingers and adjustably threaded therein, a guide for the screw carried by the other finger, the screw and guide coacting to constitute a stop, limiting the relative movement of the fingers in one direction, and a compression spring carried by said screw and abutting said guide and the finger by which the screw is carried.

5. In a setting mechanism for recording scales, in combination with a floating locating disc provided peripherally with a plurality of evenly spaced teeth and intervening recesses, an alignment and weight locating finger assembly arranged to coact with the locating disc in determining a setting for the recording mechanism or the like, said finger assembly including a weight-locating finger having a centrally located edge portion on an end face presented toward the locating disc, an alignment finger slidably carried on the weight-locating finger and characterized by an end face portion having a plurality of apices thereon, the spacing of which is somewhat less than that of the teeth on the locating disc, a guide element embracing both of said fingers and through which the fingers are slidably reciprocally mounted, an apertured boss carried by the weight locating finger rearwardly of the alignment finger, an elongate screw element provided with a head and extending through the aperture in said boss, and in adjustably threaded relation with the rear end of the alignment finger, a coil spring carried by said screw between the boss and the rear face of the alignment finger, the head of the screw element coacting with said boss, in limiting the outward movement of the alignment finger in a direction toward the locating disc, but the screw being so adjusted as to cause the alignment finger to extend appreciably forwardly of the weight-locating finger prior to engagement of the disc by the fingers.

LOWELL F. MUNSON.